(12) United States Patent
McIntyre et al.

(10) Patent No.: US 9,278,808 B1
(45) Date of Patent: Mar. 8, 2016

(54) SYSTEM AND METHOD OF USING DIFFERENTIAL ELEVATION INDUCED ENERGY FOR THE PURPOSE OF STORING WATER UNDERGROUND

(71) Applicant: The Regents of the University of Colorado, a body corporate, Denver, CO (US)

(72) Inventors: William C. McIntyre, Broomfield, CO (US); Kevin L. Rens, Louisville, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 14/668,339

(22) Filed: Mar. 25, 2015

Related U.S. Application Data

(63) Continuation of application No. 14/532,644, filed on Nov. 4, 2014.

(60) Provisional application No. 61/900,561, filed on Nov. 6, 2013.

(51) Int. Cl.
*B65G 5/00* (2006.01)
*E02B 11/00* (2006.01)

(52) U.S. Cl.
CPC .............. *B65G 5/005* (2013.01); *E02B 11/005* (2013.01)

(58) Field of Classification Search
CPC ....... E02B 11/00; E02B 11/005; E02B 13/00; B65G 5/005
See application file for complete search history.

(56) References Cited

U.S. PATENT DOCUMENTS

| | | | | |
|---|---|---|---|---|
| 599,719 | A * | 3/1898 | Manning | 405/50 |
| 1,866,826 | A * | 7/1932 | Strothmann | 405/45 |
| 3,996,741 | A * | 12/1976 | Herberg | 60/398 |
| 4,180,348 | A * | 12/1979 | Taylor | 405/39 |
| 4,326,818 | A * | 4/1982 | Willis | 405/55 |
| 4,820,080 | A * | 4/1989 | Varkonyi et al. | 405/45 |
| 4,988,235 | A * | 1/1991 | Hurley | 405/50 |
| 5,228,802 | A * | 7/1993 | Kuwabara et al. | 405/41 |
| 5,634,740 | A * | 6/1997 | Takada et al. | 405/52 |
| 5,909,982 | A * | 6/1999 | Takada et al. | 405/52 |
| 6,840,710 | B2 * | 1/2005 | Peters et al. | 405/57 |
| 6,948,886 | B1 * | 9/2005 | Jackson | 405/302.6 |
| 7,153,060 | B1 * | 12/2006 | Bennion | 405/75 |
| 7,438,080 | B2 * | 10/2008 | Johnson | 137/209 |
| 7,972,080 | B2 * | 7/2011 | Summers et al. | 405/53 |
| 7,993,076 | B2 * | 8/2011 | Hopf | 405/43 |

* cited by examiner

*Primary Examiner* — Frederick L Lagman
(74) *Attorney, Agent, or Firm* — Perkins Coie LLP

(57) ABSTRACT

An underground water storage system filled without pumps is provided. The underground water storage system comprises a water source at a first elevation and an underground water storage facility at a second elevation, less than the first elevation. The underground water storage facility is in fluid communication with the water source by a piping and valve system. The pressure difference between the water source at the first elevation and the underground water storage facility provides the motive force to fill the underground water storage system.

20 Claims, 6 Drawing Sheets

SYSTEM AND METHOD OF USING DIFFERENTIAL ELEVATION INDUCED ENERGY FOR THE PURPOSE OF STORING WATER UNDERGROUND

CROSS-REFERENCE TO RELATED PATENT APPLICATIONS

The present application is a continuation of U.S. patent application Ser. No. 14/532,644, titled "System And Method Of Using Differential Elevation Induced Energy For The Purpose Of Storing Water Underground" filed on Nov. 4, 2014, which claims priority to and benefit from U.S. Provisional Patent Application No. 61/900,561 titled "System And Method Of Using Differential Elevation Induced Energy For The Purpose Of Storing Water Underground" filed on Nov. 6, 2013, the entire content of each of which is herein expressly incorporated by reference.

BACKGROUND

Conventional wisdom, whether correct or not, predicts that water resources will become increasingly scarce. This is particularly problematic in arid climates, which climates include desserts and high plains desserts such as, for example, parts of Colorado, U.S.A. Regions may compensate for a general lack of water using water storage facilities and reservoirs. Reservoirs can be used to store vast amounts of water over large tracts of land but suffer drawbacks. Reservoirs are typically exposed resulting in a higher rate of evaporation and a potential for contamination to name but two drawbacks.

Many attempts to overcome the drawbacks of reservoirs have been tried, including using aquifers, which is generally a type of underground water storage. Typically, an aquifer is a subsurface, porous region that is saturated with water. The region may contain gravel or crushed rock, for example. One specific type of subsurface structure that can be saturated with water is an alluvium. Generally, alluvium is associated with riverbeds or mountainous areas and comprises horizontal layers of materials deposited by water over time, which materials include the aforementioned gravel, crushed rock, and the like.

An underground water storage area is typically bounded by an aquitard, which is a bed of low permeability, or an aquiclude, which is a water impermeable barrier such as, for example, bedrock. Manmade impermeable barriers may be arranged in an aquifer to form an underground water storage facility. In other words, once water is introduced to the underground water storage, it will not naturally flow out. The formed underground water storage facility functions somewhat as a pool to store the water.

Conventionally, underground water storage facilities are filled, or charged, with water using either a flood method or a pumping method. A flood method is a slow process to saturate the underground water storage facility and includes flooding the surface area (e.g., the flood plane) above the underground water storage facility or the like. Alternatively, pumps may be coupled to wells to force water into the underground water storage area rapidly under pressure. Pumps, however, require a significant amount of energy and increase a carbon footprint associated with the storage of water.

Accordingly, there is a need for improved systems and methods for charging an underground water storage area.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Figure 1:
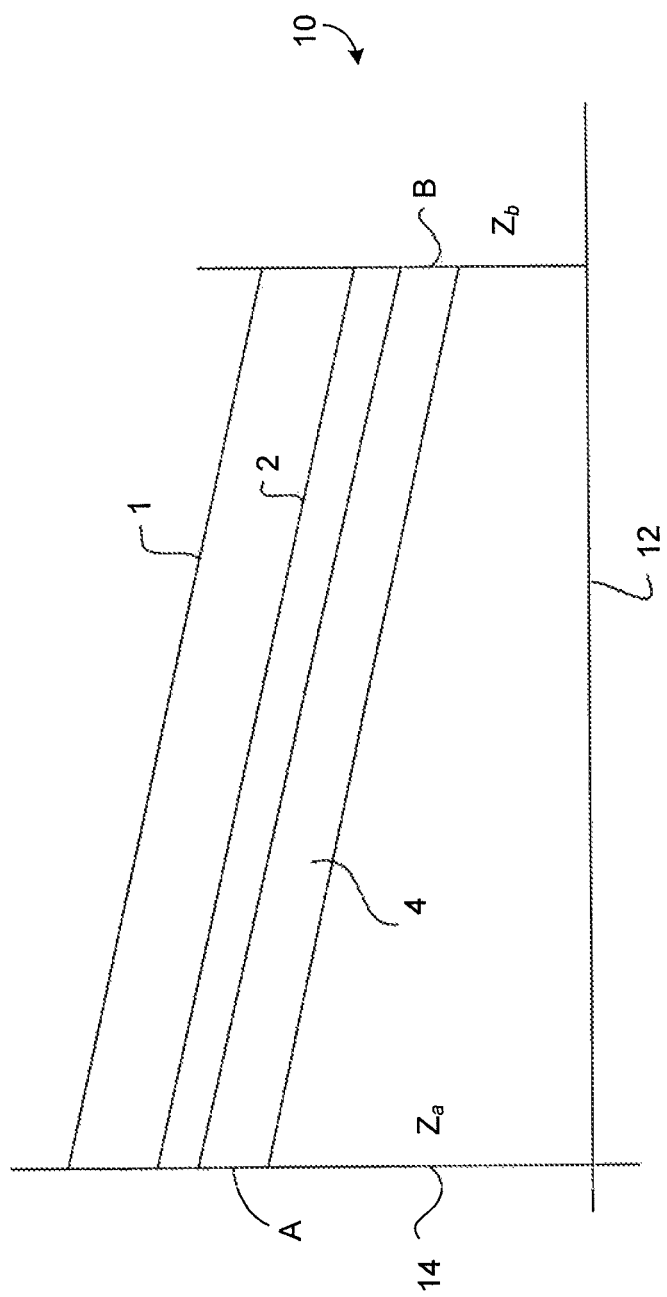
FIG. 1 depicts a schematic view of a water storage structure and system consistent with the technology of the present application.

The technology of the present application will now be described more fully below with reference to the accompanying figures, which form a part hereof and show, by way of illustration, specific exemplary embodiments. The embodiments of the technology are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to an underground water storage area formed from a subsurface, porous region bounded by water impermeable structures, whether natural or manmade. As explained herein, pressure to charge the underground water storage is provided by diverting water from a water source sufficiently elevated from the underground water storage that is piped to the underground water storage area. The elevation provides a pressure head to charge, or fill, the underground water storage area rapidly. However, the technology described herein may be used for fluids other than water. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

In more detail, the technology of the present application pertains to water fluid mechanics, physical sites of water diversion, and physical sites of downstream water storage. The technology described herein provides water to be stored underground, in alluvial deposits or the like. In many cases, the water storage will be adjacent to existing stream systems, but the technology allows for the aquifer to be located remote from stream systems.

It is estimated that as a result of climate change, water supplies for the Western United States are predicted to decrease, in both volume and peak runoff flows during extreme precipitation events. With the population of the same area expected to increase, innovative methods of storing water for municipal, industrial, agricultural, and domestic consumption, need to be developed. The temperatures are predicted to increase and, therefore, evaporation of open water bodies will increase accordingly. Typical methods of storing large quantities of water, including water storage reservoirs, which are constructed above ground, are of limited value moving forward. For a variety of reasons, the era of large on-stream dams is probably nearing an end. With increases in population and changes in western water rights from agricultural uses to domestic uses, additional water storage facilities are needed. In Colorado, as an example, it is estimated there is approximately 10,000,000 acre-feet of storage space in the alluvium of the State's streams alone. This amount of potential water storage is equivalent to $3.25 \times 10^{13}$ gallons of water (or 32,582 billion gallons). The alluvium provides the capability of underground water storage—without, or at least with reduced, evaporation. In the Western United States, net evaporation is about 3 feet per annum. Therefore, large quantities of water stored underground eliminate or reduce the evaporative loss component relatively significantly.

With reference now to FIG. 1, a schematic 10 outlining the principles to allow for water storage in an underground water storage area are provided. The schematic 10 uses an existing hydraulic principle, referred to as Bernoulli's equation, that predicts hydraulic properties of fluids between different starting and ending elevations. The equation contains an elevation head component, a pressure head component, velocity head component, and a term for energy loss due to piping bends, lengths, and pipe material. Bernoulli's equation applies to hydraulic systems, when comprised of fluid within a pipe. As an example, if the starting elevation of the pipe is higher than the ending elevation of the same pipe, it is possible to determine the flow rate and pressure of the fluid at the lower elevation portion of the pipe. This principle is illustrated in the schematic 10 comprising a horizontal 12 and a vertical 14, which represents relative elevation of the water source and the water storage with respect to the horizontal. FIG. 1 further shows the energy gradeline 1 and the hydraulic gradeline 2, which run in parallel from the upper elevation to the lower elevation. A pipe 4 is provided that is shown running from the upper elevation A to the lower elevation B. The upper elevation is a distance $Z_a$ above the horizontal and the lower elevation is a distance $Z_b$ above the horizontal. The hydraulics of pressure conduits are governed by Bernouilli's equation, which states that the vertical distance 14 above an arbitrary horizontal datum 12; the pressure head, the average velocity of flow, and the total head loss between the beginning and end points. In the present application, point A represents a stream diversion structure and point B represents the inlet to the porosity storage vessel. A pipe connects points A and B, with no exposure to atmospheric pressure, and is under constant pressure between both points. As a result of the conservation of energy principle, these terms are equal to each other when comparing the beginning and ending points as shown in equation 1.

$$Z_a + P_a/\gamma + V_a^2/2g = Z_b + P_b/\gamma + V_b^2/2g + h_l \qquad \text{Equation 1}$$

Where Z=the vertical distance 14 above the horizontal 12, P/γ is the pressure head, V is the velocity of flow, and $h_l$ is the total head loss between the high point A and the low point B (in this case, the water supply and the water storage).

Figure 2:
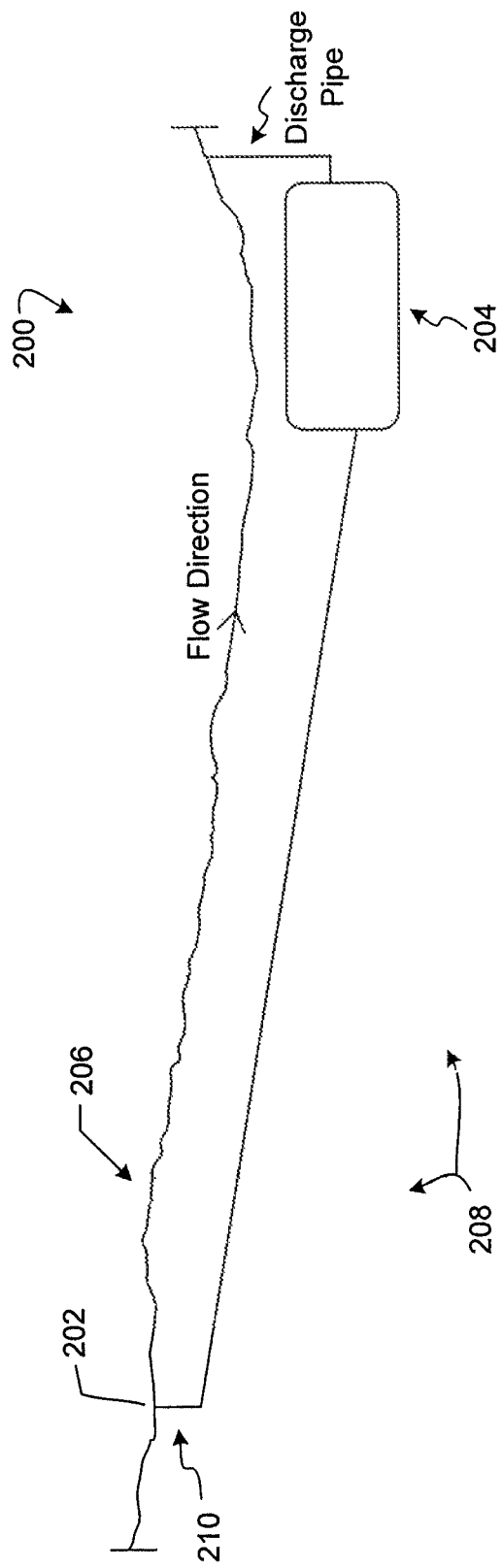
FIG. 2 depicts a plan view of the water storage structure and system consistent with FIG. 1.
Figure 3:
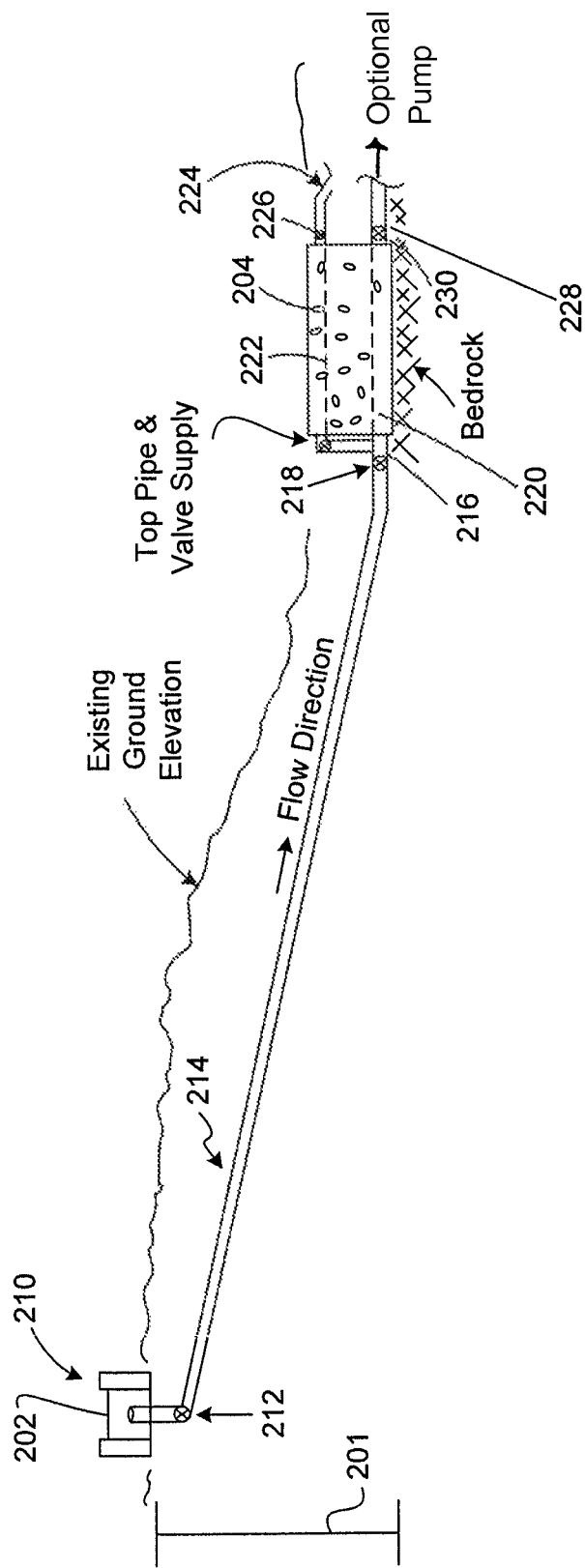
FIG. 3 depicts a side cross-sectional elevation view of the water storage structure and system consistent with FIG. 1.

With reference now to FIGS. 2 and 3, a system 200 is shown describing the structure of the technology of the present application. In particular, the system 200 is shown with operation close to a water source 202. The water source 202, in the present application, may include a waterway such as, for example, a stream or river. An underground water storage facility 204 is shown downstream from the water source 202 and generally proximate a waterway 206, such as, for example, a river or stream, extending between the water source 202 and the water storage facility 204. The water source 202 is at a higher altitude than the underground water storage facility 204, which elevation difference 201 is shown by the sectional view of FIG. 3. The system 200 is shown in proximity to the waterway 206, but system 200 does not need to be positioned close to the waterway 206. Also, the water source 202 may be a manmade source such as, for example, a water tower, manmade lake, or the like. The water source 202 is in fluid communication with the underground water storage facility 204 via a piping and valve system 208. The piping and valve system 208 includes an inlet 210 with a shutoff valve 212. The inlet 210 may include a diversion structure to divert a portion of the stream flow if the water source is a waterway. Alternatively, if the water source is a lake, pool, or tower, the diversion structure may be a pipe coupled to a lower portion of the water source. The shutoff valve 212 may be a solenoid valve, a pneumatic valve, a manual valve, or the like. A pipe 214, and generally a plurality of pipe sections joined at flanged intersections, connects to an outlet 216 that also includes a shutoff valve 218, which may be the same as shutoff valve 212. The inlet 210 is connected to the base or lower portion of the water source 202 and the outlet 216 is coupled to underground water storage facility 204. The outlet could be connected to the bottom 220 or the top 222 of the underground water storage facility 204 to either top or bottom fill of the underground water storage facility 204. The underground water storage facility 204 may be formed of alluvial material that occurs naturally or is manmade. The underground water storage facility 204 may be formed using for example, methodologies disclosed by U.S. Pat. Nos. 6,840,710 and 7,972,080, both of which are incorporated herein by reference as if set out in full. The underground water storage facility 204 typically does not include a top barrier. Thus, the technology of the present application may provide an overfill discharge pipe 224. The overfill discharge pipe 224 may have a shutoff valve 226 that opens when a sensor determines that the underground water storage facility 204 is at or above its maximum capacity, or within a margin of error. The underground water storage facility 204 also has a discharge pipe 228 with a discharge control valve 230. The discharge control valve 230 would be controllable such that the water stored in the underground water storage facility 204 is retrievable. In certain embodiments, the discharge control valve 230 opens to draw water from the underground water storage facility 204 that also causes the shutoff valves 212 and 218 to open such that the underground water storage facility 204 is filled while the water is being discharged. The overfill pipe 224 and the discharge pipe 228 may, in certain embodiments, be routed to the waterway 206 or to a public/private water system. The pressure used to fill the underground water storage facility 204 also is used in this particular embodiment as the motive force to cause water to flow out of the underground water storage facility 204. Alternatively and optionally, the discharge pipe 228 (or the overfill discharge pipe 224) may be coupled to the inlet of one or more pumps (not specifically shown). Coupling a pump or pumps to the discharge pipe 228 (and/or) overfill discharge pipe 224) provides the ability to rapidly evacuate the underground water storage facility 204. Generally, the pump or pumps should have a bypass to provide the option of either using the pump or pumps to evacuate water from the underground water storage facility 204 or using the pressure head in the piping and valve system 208 to evacuate water from the underground water storage facility 204.

Figure 4:
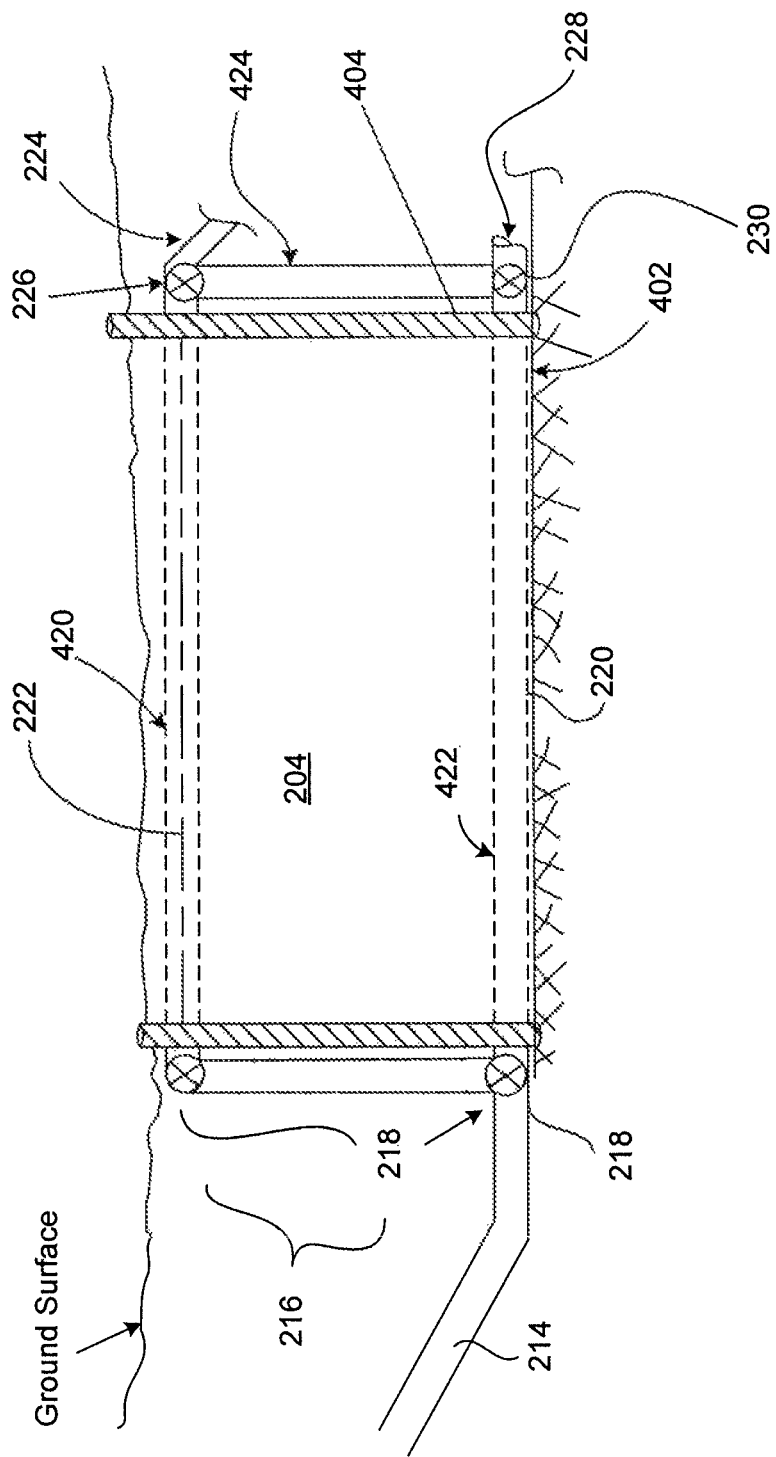
FIG. 4 depicts a cross-sectional elevation view of the aquifer of the water storage structure and system consistent with FIG. 1.

FIG. 4 shows the underground water storage facility 204 in additional detail. The underground water storage facility 204 may be located above bedrock 402, which may be an aquiclude material that is naturally occurring or manmade.

Generally, manmade sidewalls 404, which are shown vertical but could be flared inward or outward, are keyed into the bedrock. The sidewalls 404 may be manmade as described or, in certain embodiments, all or portions of the sidewalls 404 may be naturally occurring. The manmade sidewalls 404 are made from an aquiclude material as well. The underground water storage facility 204 is thus bounded on a plurality of sides with a water impermeable material. Notice, while shown generally rectangular in shape, the underground water storage facility 204 may take any number of shapes including, for example, circular, elliptical, square, triangular, a polygonal shape, or even random shapes. The top (or roof) area of the underground water storage facility 204 is generally left open. Providing the top open facilitates drainage and filling of the underground water storage facility 204. For example, providing an open or vented top inhibits the formation of a vacuum lock. The drainage or discharge may be facilitated as described above or, in the alternative, a number of wells may be drilled or formed into the underground water storage facility 204. As mentioned above, the discharge system may be interconnected with the fill system such that when the discharge system is activated, the fill system is activated to keep the underground water storage facility 204 close or at capacity. In other embodiments, electronic sensors (not specifically shown) may be placed in the underground water storage facility 204 such that when the water level drops below a certain level, a controller causes the shutoff valves 212 and 218 to open and place the underground water storage facility 204 to be in fluid communication with the water source 202. Also, the water source 202 may include one or more electronic sensors to override any fill commands if the water source 202 is either empty or below a predetermined volume/level. FIG. 4 also shows the outlet 216 of the pipe 214 that interconnects to shutoff valve 218, which are two shutoff valves in this exemplary embodiment. The outlet 216 of the pipe 214 is in fluid communication with a discharge and intake manifolds 420, 422. The discharge and intake manifolds 420, 422 are, in this exemplary embodiment, perforated pipes that allow fluid to freely move from a higher pressure to a lower pressure. In this case, multiple manifolds are provided, but the discharge and intake manifolds may be a single unit in some embodiments. When the manifold is in fluid communication with the relatively higher pressure water source, the water flows from inside the manifold to outside the manifold. When the manifold is in fluid communication with the relatively lower pressure water discharge system, the water flows from outside the manifold to inside the manifold. The discharge manifold 422 is in fluid communication with the discharge pipe 228. Optionally, as shown, the overflow pipe 224 may be in fluid communication with the discharge pipe 228 via an overflow discharge pipe 424 as shown. As can be appreciated, the description of the fill method above mentions specifically either a bottom fill or a top fill of the underground water storage facility 204. However, as is clear from FIG. 4, the underground water storage facility 204 may be filled using a combination of bottom and top fill. The manifolds 420 and 422 may be centrally located to allow for an intermediate fill as well.

Figure 5:
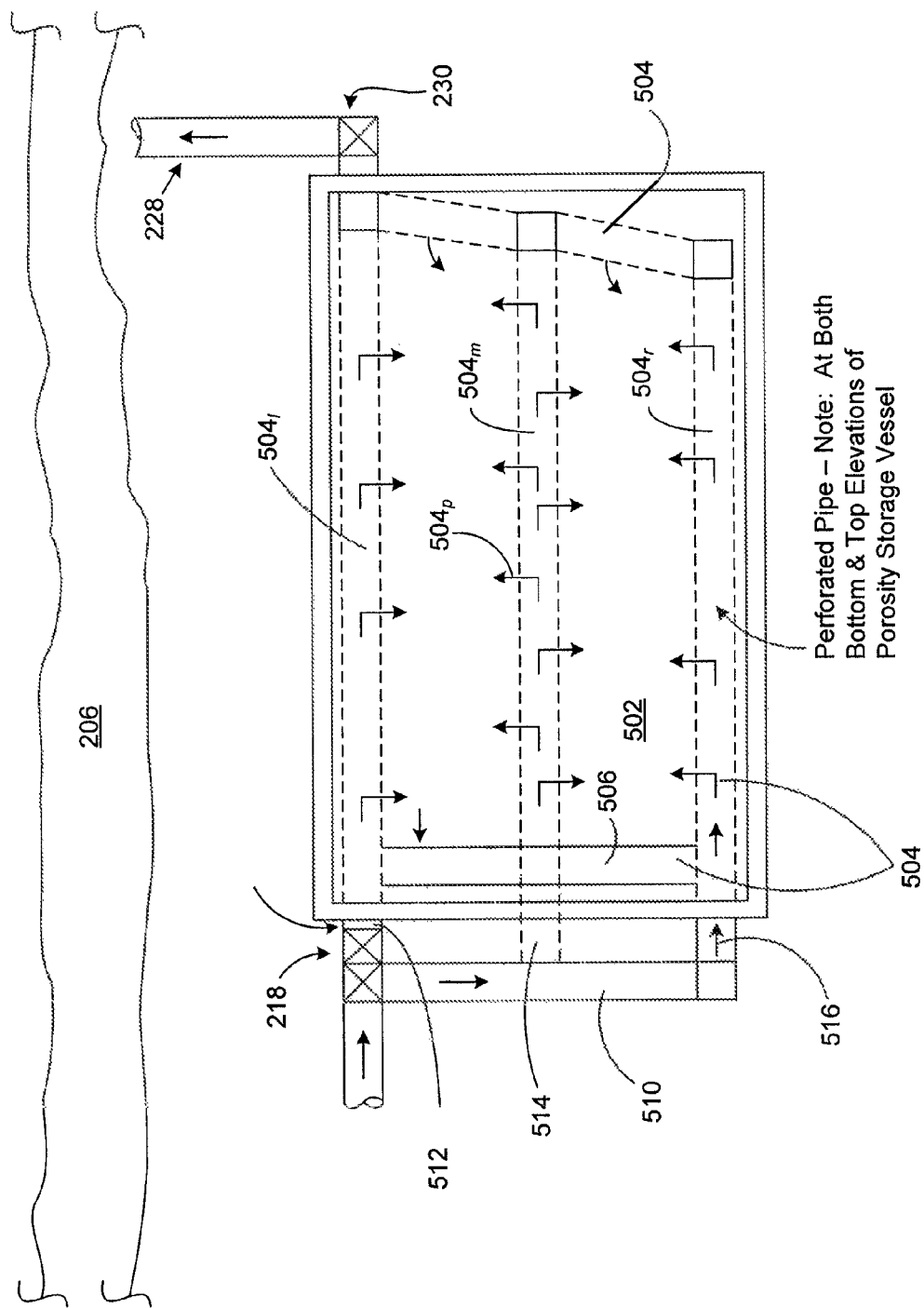
FIG. 5 depicts a plan view of the aquifer of FIG. 4.

FIG. 5 shows a plan view of an underground water storage facility 500. The underground water storage facility 500 includes a base 502 and at least one sidewall 504 extending upwards from the base 502. As mentioned above, the base 502 may be bedrock or manmade material. The sidewalls also may be natural or manmade material as described above. The underground water storage facility 500 includes a discharge/intake manifold 504. The discharge/intake manifold 504 includes a plurality of perforations $504_p$. The discharge/intake manifold 504, in this embodiment, may include a left portion $504_l$, a middle portion $504_m$, and a right portion $504_r$. Each of the portions 504 may be coupled to an internal pipe 506 to direct fluid to each of the portions. Alternatively to providing separate portions into the underground storage facility 500, a horizontal manifold feed pipe 510 may provide a left, middle, and right branch 512, 514, 516. The multiple connections to the underground water storage facility 500 allows for smoother filling of the underground water storage facility 500.

As explained above, the higher elevation of the water source 202 and the lower energy of the underground water storage facility 204 provides a pressure or hydraulic head that may be used as a motive force to pressure fill the underground water storage facility 204. The energy (converted from potential energy to kinetic energy) is contained within the pipe from the water source 202, which may be the point of diversion for a waterway such as a stream or a tap point for a standing body of water, to the boundary of the underground water storage facility 204, which is at a lower elevation and is converted into work to fill underground water storage facility 204. This eliminates the need for a power source for pumps, whether grid power, battery power, green power, or combustion power.

Figure 6:
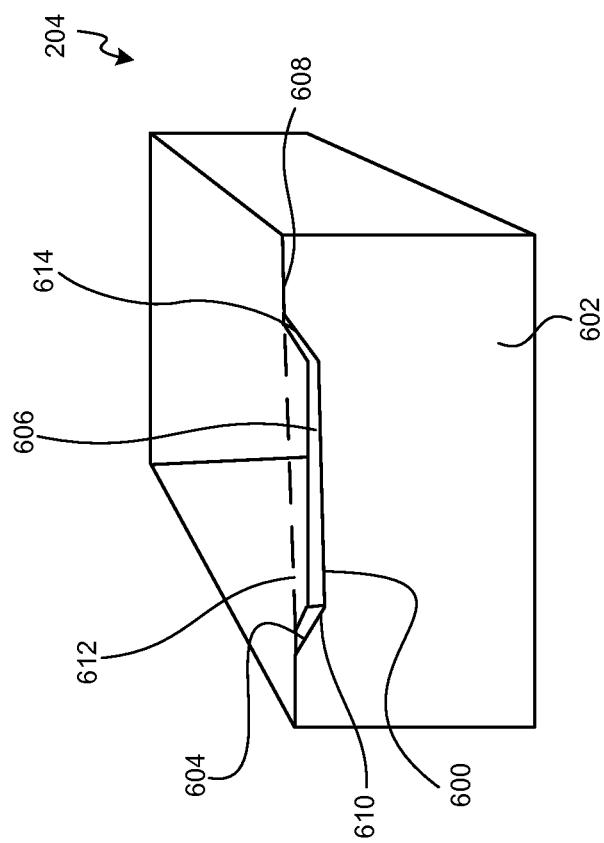
FIG. 6 depicts an elevation view of a water storage structure consistent with the technology of the present application.

As can be appreciated, water rights are a complex body of law. Thus, generally speaking, the underground water storage facility 204 can only receive water for storage if the entity owning the underground water storage facility 204 owns the rights to the water being diverged from, for example, a waterway 206, such as a stream. In at least one embodiment described above, however, the underground water storage facility 204 is located proximate the waterway 206. Waterway 206 may, in certain instances, contain a sufficient amount of water that the water is essentially free water—e.g., not constrained by priority water rights. The water may be contained in the waterway 206 or in a floodplain. The underground water storage facility 204 may be placed to take advantage of the excess water in the waterway 206 (or water source 202) by being located in a position such that water may "spill" into the underground water storage facility 204. With reference to FIG. 6, the underground water storage facility 204 may be constructed with a reverse spillway 600. The reverse spillway 600 is designated a reverse spillway because it is intended that water flow into the underground water storage facility 204 rather than spill out of the underground water storage facility 204 as would be a more conventional use of the word spillway. The reverse spillway 600 is a recessed section of the water facing side 602 of the underground water storage facility 204. The water facing side 602 may simply be a portion of the underground water storage facility 204 that is relatively proximate the waterway relative to the remainder of the facility. The water facing side 602 means the side of the underground water storage facility 204 closest to the waterway 206, floodplain, or water source as the case may be. The reverse spillway 600 in this particular embodiment is shown having a trapezoidal shape with converging sides 604 and a bottom 606. While shown as having a trapezoidal shape, the reverse spillway 600 could be any number of shapes, including, for example, a rectangular shape, an arched shape, a triangle shape, or the like. In some embodiments, the reverse spillway 600 may be a lowering of the top edge 608 of the underground water storage facility 204 or, in other embodiments, a lowering of the top edge 608 of only the water facing side 602 of the underground water storage facility 204. It is envisioned that the reverse spillway 600 would extend along a majority of the water facing side 602 and in most cases extend over a substantial majority of the water facing side 602. A majority of the water facing side 602 means, in this context, at least 50% of the length, and a substantial majority of the water facing side 602 means, in this context, greater than 60% of the water facing side 602.

As is generally known, water causes erosion over time. Thus, the natural or manmade sidewall 602 in which the reverse spillway 600 resides may erode over time. To inhibit the erosion, the sides 604 and bottom 606 of the reverse spillway 600 may have a reinforcing layer 610, such as metal plating, to resist the erosive force of the water spilling into the underground water storage facility 204 through the reverse spillway 600. To inhibit material from entering the underground water storage facility 24 through the reverse spillway 600, the reverse spillway 600 may be formed with a screen or filter 612 that allows water to freely pass, but inhibits other debris from entering, such as, for example, trash, sticks, leaves, etc.

The reverse spillway 600 may effectively lower the maximum amount of water that can be stored by the underground water storage facility 204. To increase the maximum capacity, the reverse spillway 600 may be provided with a check valve 614 that allows the reverse spillway 600 to open when the water level is below the bottom 606 of the reverse spillway 600 but closes as other fill methods increase the water capacity above the bottom 606.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A naturally powered system for underground fluid storage, comprising:
    a fluid source located at first elevation;
    an underground fluid storage facility substantially bounded by one or more water impermeable barriers located at a second elevation wherein the second elevation is below the first elevation; and
    a piping and valve system having an inlet proximal the fluid source and an outlet proximal the underground fluid storage facility placing the fluid source in fluid communication with the underground fluid storage facility wherein a hydraulic head of the fluid source and piping and valve system causes fluid to fill the underground fluid storage facility.

2. The system of claim 1 wherein the fluid source is a water source and the underground fluid storage facility is an underground water storage facility.

3. The system of claim 2 wherein the water source is a waterway.

4. The system of claim 2 wherein the underground water storage facility is an alluvium.

5. The system of claim 1 wherein the piping and valve system comprises an inlet shutoff valve proximal the fluid source and an outlet valve proximal the underground fluid storage facility.

6. The system of claim 1 wherein the outlet is coupled to a bottom of the underground fluid storage facility.

7. The system of claim 5 further comprising a sensor to open the inlet and outlet shutoff valves when the sensor determines the fluid level in the underground storage facility is below a predetermined threshold.

8. The system of claim 5 further comprising a discharge pipe coupled to the underground fluid storage facility and a discharge control valve selectively placing the underground fluid storage facility in fluid communication with the discharge pipe.

9. The system of claim 8 wherein opening of the discharge control valve causes the inlet and outlet shutoff valves to open.

10. The system of claim 1 further comprising an overflow pipe coupled to the top of the underground fluid storage facility.

11. The system of claim 10 wherein the overflow pipe places the underground fluid storage facility in fluid communication with the water source downstream from the inlet.

12. A method of filling an underground porous water storage facility comprising the steps of:
    providing a fluid source at a first elevation and an underground porous fluid storage facility at a second elevation such that the first elevation is at a higher altitude than the second elevation, wherein the underground porous fluid storage substantially bounded by a fluid impermeable barrier to define a volume which vents to atmosphere;
    placing the fluid source and the underground porous fluid storage facility in fluid communication;
    establishing a hydraulic head between the fluid source and the underground porous fluid storage facility; and
    transferring fluid from the fluid source to the underground porous fluid storage facility by opening at least one shutoff valve.

13. The method of claim 12 wherein the at least one shutoff valve is opened automatically.

14. The method of claim 13 wherein the at least one shutoff valve is opened automatically based on a signal from an electronic sensor in the underground porous fluid storage facility.

15. The method of claim 12 wherein the fluid source is a water source and the underground porous fluid storage facility is an underground porous water storage facility.

16. The method of claim 15 wherein the water source is provided by diverting water from a waterway.

17. The method of claim 15 wherein the water source is provided by a water tower.

18. The system of claim 1 further comprising a discharge pipe coupled to the underground fluid storage facility and a discharge control valve selectively placing the underground fluid storage facility in fluid communication with the discharge pipe, and a pump having an inlet wherein the inlet of the pump is in fluid communication with an outlet of the discharge pipe.

19. An apparatus, comprising:
- an underground fluid storage facility comprising an alluvium located proximate a waterway, the underground fluid storage facility comprising:
  - a bottom surface comprising a fluid impermeable material;
  - at least one sidewall of a fluid impermeable material extending upwards from the bottom surface to a top edge, wherein the bottom surface and at least one sidewall define a volume;
  - the at least one sidewall comprising at least a portion proximate the waterway; and
  - at least one reverse spillway in the portion proximate the waterway wherein the reverse spillway has a bottom below the top edge.

20. The apparatus of claim 19 further comprising a filter extending along the at least one reverse spillway.

* * * * *